United States Patent
Okumura et al.

(10) Patent No.: US 6,922,377 B2
(45) Date of Patent: Jul. 26, 2005

(54) RECORDED DISK REPRODUCING DEVICE CAPABLE OF ADJUSTING CONTROL VOLTAGES

(75) Inventors: Atsushi Okumura, Hyogo (JP); Masayoshi Takehata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 100 days.

(21) Appl. No.: 10/419,217

(22) Filed: Apr. 21, 2003

(65) Prior Publication Data

US 2004/0001398 A1 Jan. 1, 2004

(30) Foreign Application Priority Data

Jun. 26, 2002 (JP) ........................................ 2002-186647

(51) Int. Cl.⁷ ............................................. G11B 21/08
(52) U.S. Cl. ................................................. 369/30.17
(58) Field of Search ............................ 369/30.17, 30.1, 369/30.11, 30.12, 30.13, 30.14, 33.01, 32.01, 44.28, 44.27, 44.29; 360/78.06, 78.07, 77.02

(56) References Cited

U.S. PATENT DOCUMENTS

| | | | | |
|---|---|---|---|---|
| 4,562,562 A | * | 12/1985 | Moriya et al. | 369/30.15 |
| 4,607,358 A | * | 8/1986 | Maeda et al. | 369/30.17 |
| 4,858,214 A | * | 8/1989 | Baba | 369/30.16 |
| 4,955,009 A | | 9/1990 | Nakatsu et al. | |
| 5,077,716 A | * | 12/1991 | Takeda et al. | 369/30.14 |
| 5,220,547 A | * | 6/1993 | Yasukawa et al. | 369/30.17 |
| 5,319,623 A | * | 6/1994 | Yamada et al. | 369/30.17 |
| 5,398,221 A | | 3/1995 | Ogawa | |
| 5,566,141 A | * | 10/1996 | Yamaguchi et al. | 369/30.17 |
| 5,572,494 A | * | 11/1996 | Nakane et al. | 369/44.28 |
| 6,249,495 B1 | * | 6/2001 | Okada et al. | 369/44.28 |
| 6,801,480 B2 | * | 10/2004 | Ono | 369/30.17 |
| 6,834,028 B2 | * | 12/2004 | Itoh et al. | 369/30.17 |

FOREIGN PATENT DOCUMENTS

JP 05-159490 A 6/1993

* cited by examiner

*Primary Examiner*—Tan Dinh
(74) *Attorney, Agent, or Firm*—Sughrue Mion, PLLC

(57) ABSTRACT

A CPU compares a detected moving speed with a previously set reference moving speed and when the detected moving speed is smaller than the reference moving speed, controls to increase a motor driving voltage VM to be supplied to a motor and when the detected moving speed is larger than the reference moving speed, controls to decrease the motor driving voltage VM to be supplied to the motor 4.

8 Claims, 6 Drawing Sheets

RECORDED DISK REPRODUCING DEVICE CAPABLE OF ADJUSTING CONTROL VOLTAGES

BACKGROUND OF THE INVENTION

1. Field of the Invention

The present invention relates to a recorded disk reproducing device.

2. Description of the Related Art

In a recorded disk for music information such as a CD or a MD or a recorded disk for computer information such as a CD-ROM or a HD, information is recorded on a spiral track formed on the surface of the disk. A recorded disk reproducing device for reproducing such a recorded disk radiates an optical beam such as laser beam to the track and receives reflected light modulated by the recorded information and converts the reflected light into an electric signal by means of an optical pickup and demodulates the electric signal to reproduce the information by means of a demodulating section. For this reason, the recorded disk reproducing device is provided with driving means such as a motor for moving the optical pickup in the radial direction of the recorded disk. For example, there is provided a mechanism in which the optical pickup joined to a threaded bar coupled to a motor shaft, is moved in the radial direction of the recorded disk by the rotation of the motor. An address is recorded on the track of the recorded disk for each predetermined unit of information, so that by designating the address of a target tack, the optical pickup can be moved from the present track to the target track.

The conventional recorded disk reproducing device is constituted in a manner described above, so that it has a problem that a mechanical load applied to the motor is varied from a designed value by variations in a mechanism for moving the optical pickup and a change in an ambient temperature to vary a moving time (also called a retrieval time) even when the optical pickup moves for the same number of tracks.

SUMMARY OF THE INVENTION

The present invention has been made to solve the above mentioned problem, and the object of the present invention is to provide a recorded disk reproducing device capable of suppressing variations in the moving time of reading means such as an optical pickup and stabilizing retrieval even in a case where a mechanical load applied to the driving means such as a motor is varied from a designed value by variations in a mechanism or a change in an ambient temperature.

A recorded disk reproducing device in accordance with the present invention includes: reading means for reading information recorded on a track of a recorded disk; driving means for moving the reading means in a radial direction of the recorded disk; speed detecting means for detecting a moving speed of the reading means according to a relationship between a moving time of the reading means moved by the driving means and the number of tracks over which the reading means passes in the moving time; and voltage control means which compares a detected moving speed detected by the speed detecting means with a previously set reference moving speed and in a case where the detected moving speed is smaller than the reference moving speed, controls to increase a power supply voltage to be supplied to the driving means, and when the detected moving speed is larger than the reference moving speed, controls to decrease the power supply voltage to be supplied to the driving means.

Therefore, according to the present invention, even in a case where a mechanical load applied to the driving means is varied from a designed value by variations in a mechanism or a change in an ambient temperature, it is possible to produce an effect of suppressing variations in the moving time of the reading means and stabilizing retrieval.

DETAILED DESCRIPTION OF THE PREFERRED EMBODIMENTS

The structures of embodiments of the present invention will be described with reference to the accompanying drawings.

Embodiment 1

Figure 1:
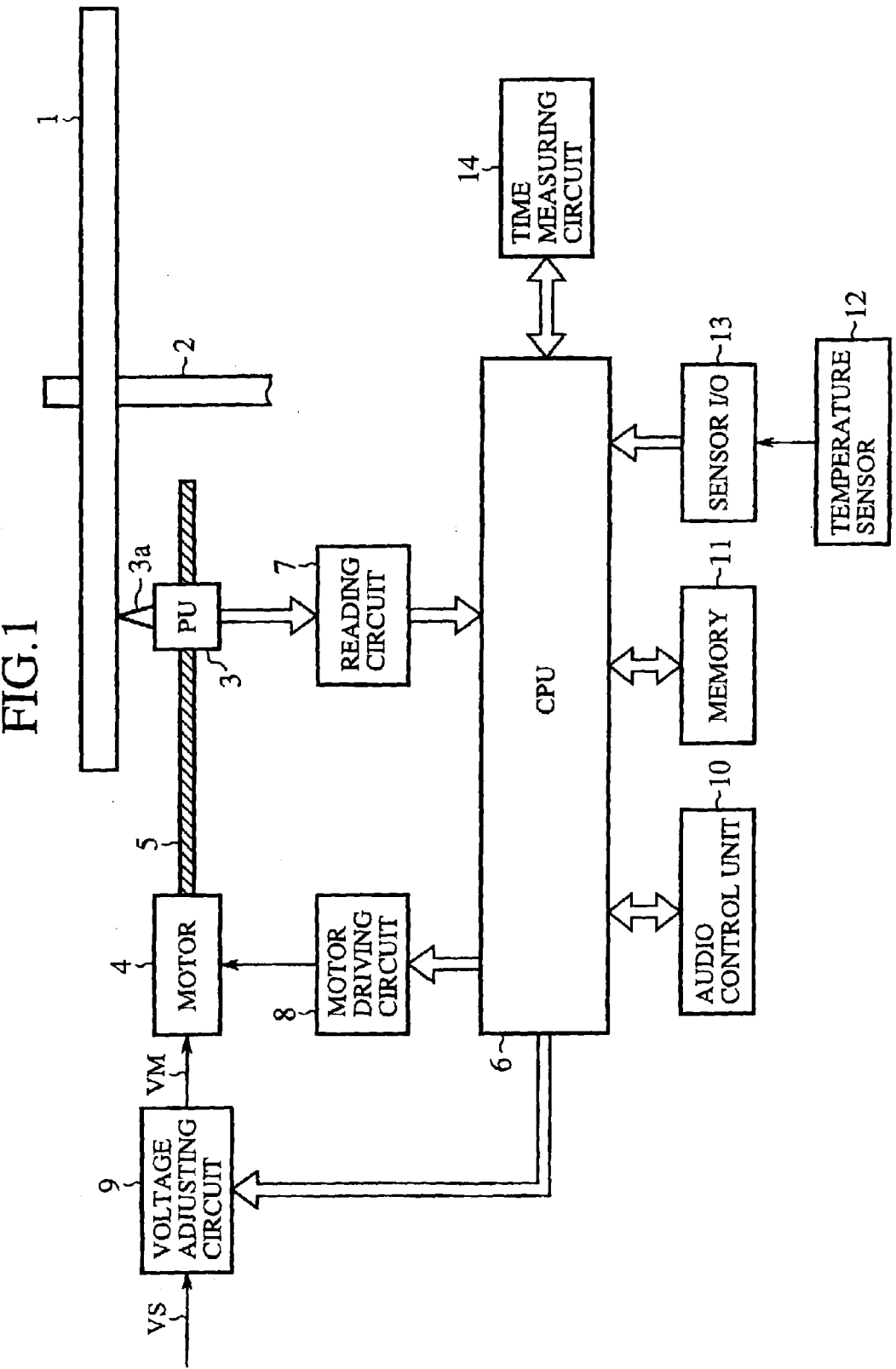
FIG. 1 is a diagram to show a partial structure of a recorded disk reproducing device in accordance with embodiment 1 of the present invention.

FIG. 1 is a diagram to show a partial structure of a recorded disk reproducing device in accordance with embodiment 1 of the present invention. In the drawing, a reference numeral 1 denotes a recorded disk on which information of music is recorded, 2 denotes rotary shaft of a spindle motor (not shown) for rotating the recorded disk 1, 3 denotes an optical pickup (reading means) which radiates laser beam 3a to the recorded disk 1 and receives reflected light modulated by the recorded information of music and converts the reflected light into electric signals, 4 denotes a motor (driving means), 5 denotes a moving shaft coupled to the motor 4 to move the optical pickup 3 in a radial direction of the recorded disk 1, 6 denotes a CPU (speed detection means, voltage control means), 7 denotes a reading circuit (reading means) for decoding the electric signal from the optical pickup 3 and inputting read signals of a predetermined format to the CPU 6, 8 denotes a motor driving circuit for driving the motor 4 according to a driving signal outputted from the CPU 6, 9 denotes a voltage adjusting circuit for adjusting a power supply voltage VS inputted from a power supply circuit (not shown) and outputting a motor driving voltage VM to be applied to the motor 4, 10 denotes an audio control unit, 11 denotes a memory, 12 denotes a temperature sensor, 13 denotes a sensor I/O for converting a temperature detection signal from the temperature sensor 12 and inputting it to the CPU 6, and 14 denotes a time measuring circuit for measuring time.

Figure 2:
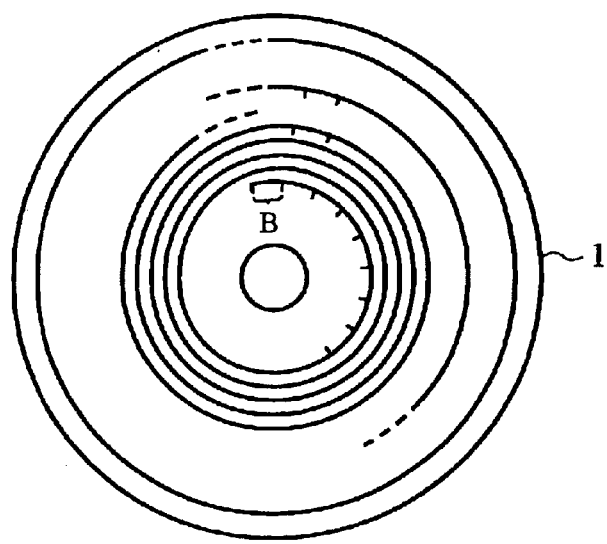
FIG. 2 is an explanatory diagram of a track on which information is recorded in a recorded disk used in the embodiment 1 of the present invention.
Figure 3:
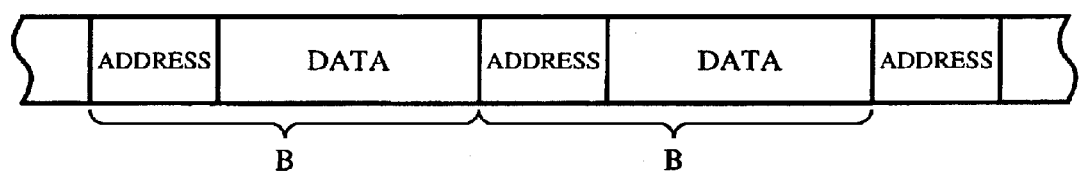
FIG. 3 is a diagram to show a format of recorded information of a recorded disk used in the embodiment 1 of the present invention.

FIG. 2 is an explanatory diagram of a track on which information is recorded in a recorded disk 1. The track is formed in the shape of a spiral on a surface of the recorded disk 1 and information is recorded on the track in a predetermined length of block B. FIG. 3 is a diagram to show a format of recorded information in each block B. As shown in this drawing, at the top of each block B is recorded an address peculiar to the block and after the address is recorded data (music information).

Figure 4:
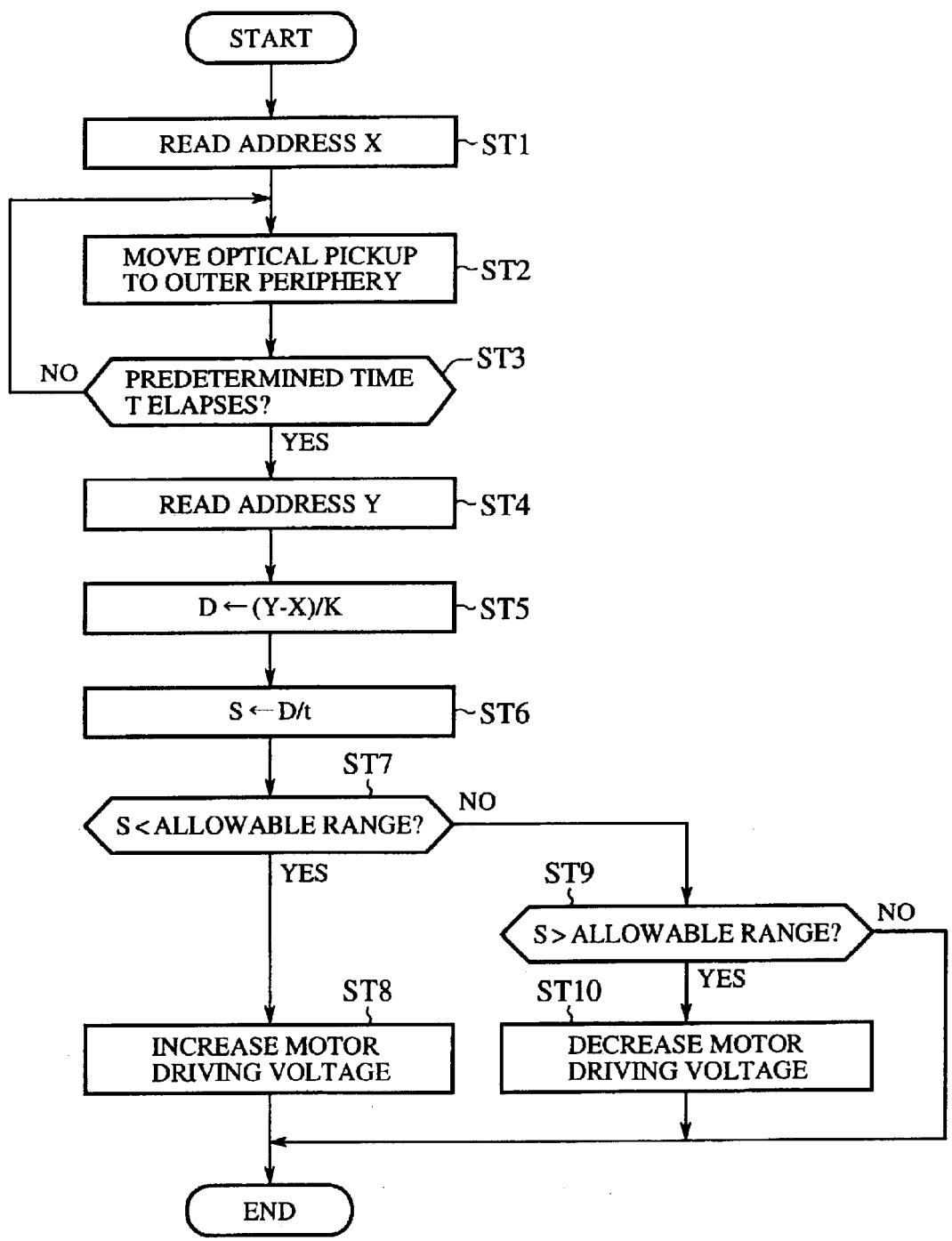
FIG. 4 is a flow chart to show an operation of a CPU used in the embodiment 1 of the present invention.

Next, an operation will be described. FIG. 4 is a flow chart of the CPU 6 used in the embodiment 1 of the present invention, which shows operation of a voltage control for suppressing the effect of variations in a load applied to the motor 4. When the recorded disk 1 is put in a recorded disk reproducing device in a state where power is ON, or when the recorded disk reproducing device in which the recorded disk 1 is put is powered on, this flow chart is executed.

First, the address X of present track in the recorded disk 1 on which the optical pickup 3 is located (hereinafter it is referred to as "present track of optical pickup"), is read and stored in the memory 11 (step ST1). Then, a start signal is applied to the motor driving circuit 8 to move the optical pickup 3 to the outer periphery of the recorded disk 1 (step ST2). At the same time, according to a timer interrupt from the time measuring circuit 14, it is judged whether a predetermined time t elapses or not (step ST3).

When the predetermined time t elapses, a stop signal is applied to the motor driving circuit 8 and the address Y of track on the recorded disk 1 on which the optical pickup 3 is located at that time is read and stored in the memory 11 (step ST4). Next, a value obtained by subtracting the address X from the address Y is divided by a factor K and a resultant value is stored in a register D of the memory 11 (step ST5). In other words, a moving distance when the optical pickup 3 is moved for the predetermined time t is detected and is stored in the register D. Further, a value obtained by dividing the moving distance in the register D by the predetermined time t is stored in a register S of the memory 11 (step ST6). That is, the moving speed of the optical pickup 3 is detected and is stored in the register S.

Next, it is judged whether or not the detected moving speed in the register S is smaller than a minimum value of the previously set allowable range (hereinafter it is refereed to as smaller than allowable range) of a reference moving speed (step ST7). In a case where the detected moving speed in the register S is smaller than the allowable range, a motor driving voltage is increased (step ST8). That is, a control signal of increasing voltage is applied to the voltage adjusting circuit 9 to control for increasing the motor driving voltage VM. In a case where the detected moving speed in the register S is not smaller than the allowable range in the step ST7, it is judged whether or not the detected moving speed is larger than a maximum value of the allowable range (hereinafter it is refereed to as larger than allowable range) (step ST9). In a case where the detected moving speed in the register S is larger than the allowable range, the motor driving voltage is decreased (step ST10). That is, a control signal of decreasing voltage is applied to the voltage adjusting circuit 9 to control for decreasing the motor driving voltage VM. In a case where the detected moving speed in the register S is within the allowable range, the motor driving voltage VM at that time is kept as it is.

As described above, according to this embodiment 1, the CPU 6 compares the detected moving speed with a previously set reference moving speed and in a case where the detected moving speed is smaller than the reference moving speed, it controls to increase the motor driving voltage VM to be supplied to the motor 4 and when the detected moving speed is larger than the reference moving speed, it controls to decrease the motor driving voltage VM to be supplied to the motor 4. Thus, even if a mechanical load applied to the motor 4 is varied from a designed value by variations in a mechanism and a change in an ambient temperature, it is possible to produce an effect of suppressing variations in the moving time of the optical pickup 3 and stabilizing retrieval.

Further, according to this embodiment 1, the CPU 6 detects the moving speed of the optical pickup 3 by the present track where the optical pickup 3 is positioned and the track where it arrives after the predetermined time, so that it is possible to produce an effect of easily obtaining variations in a mechanical load applied to the motor 4.

Still further, according to this embodiment 1, the CPU 6 detects the moving speed of the optical pickup 3 in a case where the recorded disk 1 is put in the device, so that it is possible to produce an effect of stabilizing retrieval by a minimum essential control processing.

Embodiment 2

Figure 5:
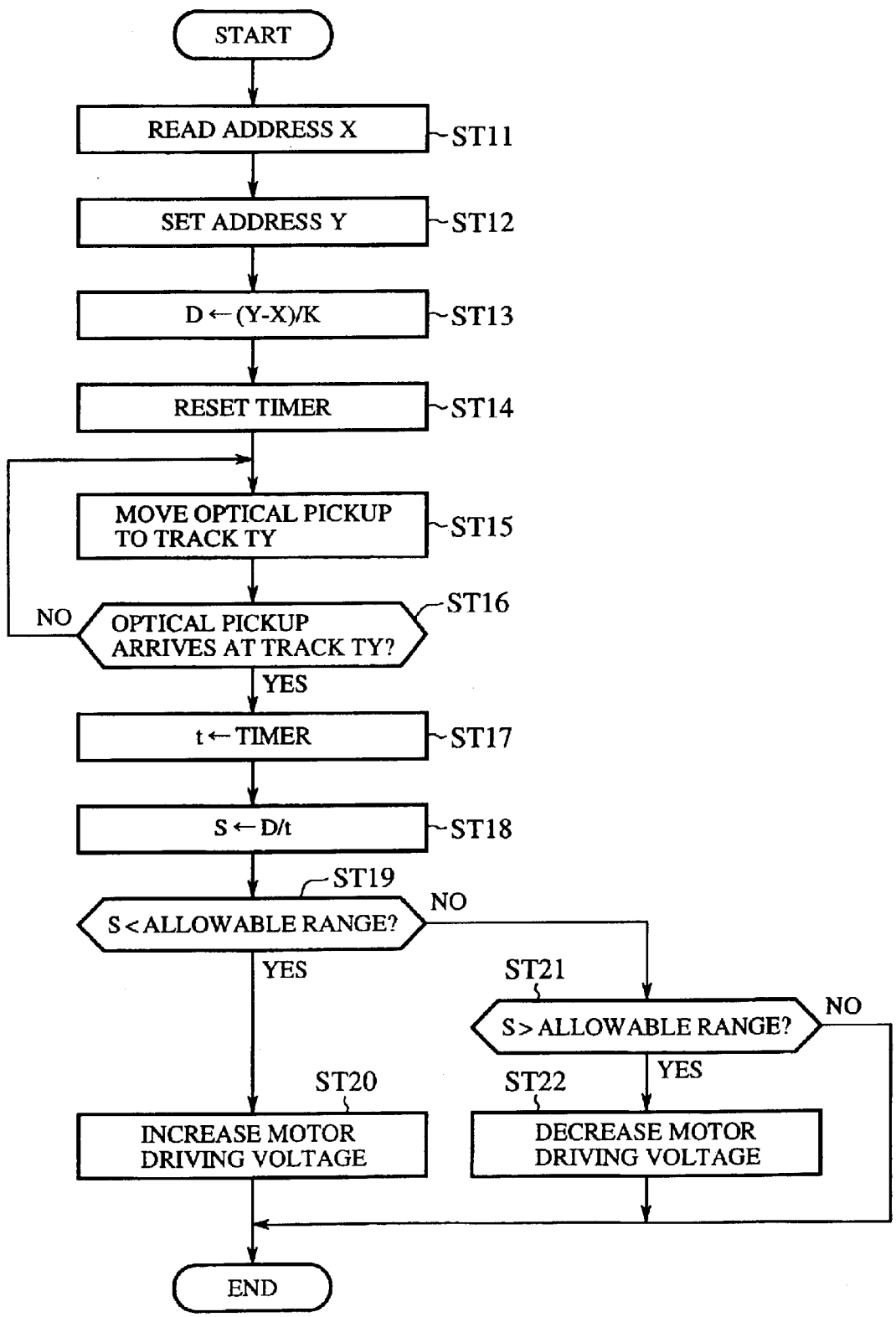
FIG. 5 is a flow chart to show an operation of a CPU used in embodiment 2 of the present invention.

The structure of a recorded disk reproducing device in accordance with embodiment 2 is the same as the structure of the embodiment 1 shown in FIG. 1. The embodiment 2 is different from the embodiment 1 in a method of detecting the moving speed of the optical pickup 3. FIG. 5 is a flow chart of the CPU 6 to show operation of a voltage control for suppressing the effect of variations in a load applied to the motor 4 in the embodiment 2. In the embodiment 2, in a case where an ambient temperature obtained from the temperature sensor 12 varies more than a predetermined range (for example, from 10 degrees to 20 degrees), this flow chart is executed.

Next, an operation will be described. First, the address X of present track TX of the optical pickup 3 in the recorded disk 1 is read and stored in the memory 11 (step ST11). Then, the address Y of a track TY separated from the present track TX by a predetermined number of addresses is designated (step ST12). Next, a value obtained by subtracting the address X from the address Y is divided by the factor K and a resultant value is stored in the register D of the memory 11 (step ST13). Then, according to a timer interrupt from the time measuring circuit 14, a timer for measuring time is reset (step ST14). Next, a start signal is applied to the motor driving circuit 8 to move the optical pickup 3 to the track TY (step ST15). Then, it is judged whether the optical pickup 3 arrives at the track TY or not (step ST16).

When the optical pickup 3 arrives at the track TY, a value of the timer is stored in a register t of the memory 11 (step ST17). That is, a moving time from the track TX to the track TY is stored in the register t. Next, a value obtained by dividing the moving distance in the register D by the moving time in the register t is stored in the register S of the memory 11 (step ST18). That is, the moving speed of the optical pickup 3 is detected and stored in the register S.

Next, it is judged whether or not the detected moving speed in the register S is smaller than the previously set allowable range of the reference moving speed (step ST19). In a case where the detected moving speed is smaller than the allowable range, the motor driving voltage is increased (step ST20). That is, a control signal of increasing voltage is applied to the voltage adjusting circuit 9 to control for increasing the motor driving voltage VM. In a case where the detected-moving speed in the register S is not smaller than the allowable range in the step ST19, it is judged whether or not the detected moving speed is larger than the allowable range (step ST21). In a case where the detected moving speed in the register S is larger than the allowable range, the motor driving voltage is decreased (step ST22). That is, a control signal of decreasing voltage is applied to the voltage adjusting circuit 9 to control for decreasing the motor driving voltage VM. In a case where the detected moving speed in the register S is within the allowable range, the motor driving voltage VM at that time is kept as it is.

As described above, according to this embodiment 2, the CPU 6 detects the moving speed of the optical pickup 3 by measuring the moving time required for the optical pickup 3 to move from the present track where it is positioned to a designated target track, so it is possible to produce an effect of easily obtaining variations in the mechanical load applied to the motor 4.

Moreover, according to this embodiment 2, the CPU 6 detects the moving speed of the optical pickup 3 when the ambient temperature varies more than a predetermined value. Thus, in a case where the load applied to the motor 4 might be varied by the effect of a temperature change, it is possible to produce an effect of stabilizing retrieval by a minimum essential control processing.

Embodiment 3

Figure 6:
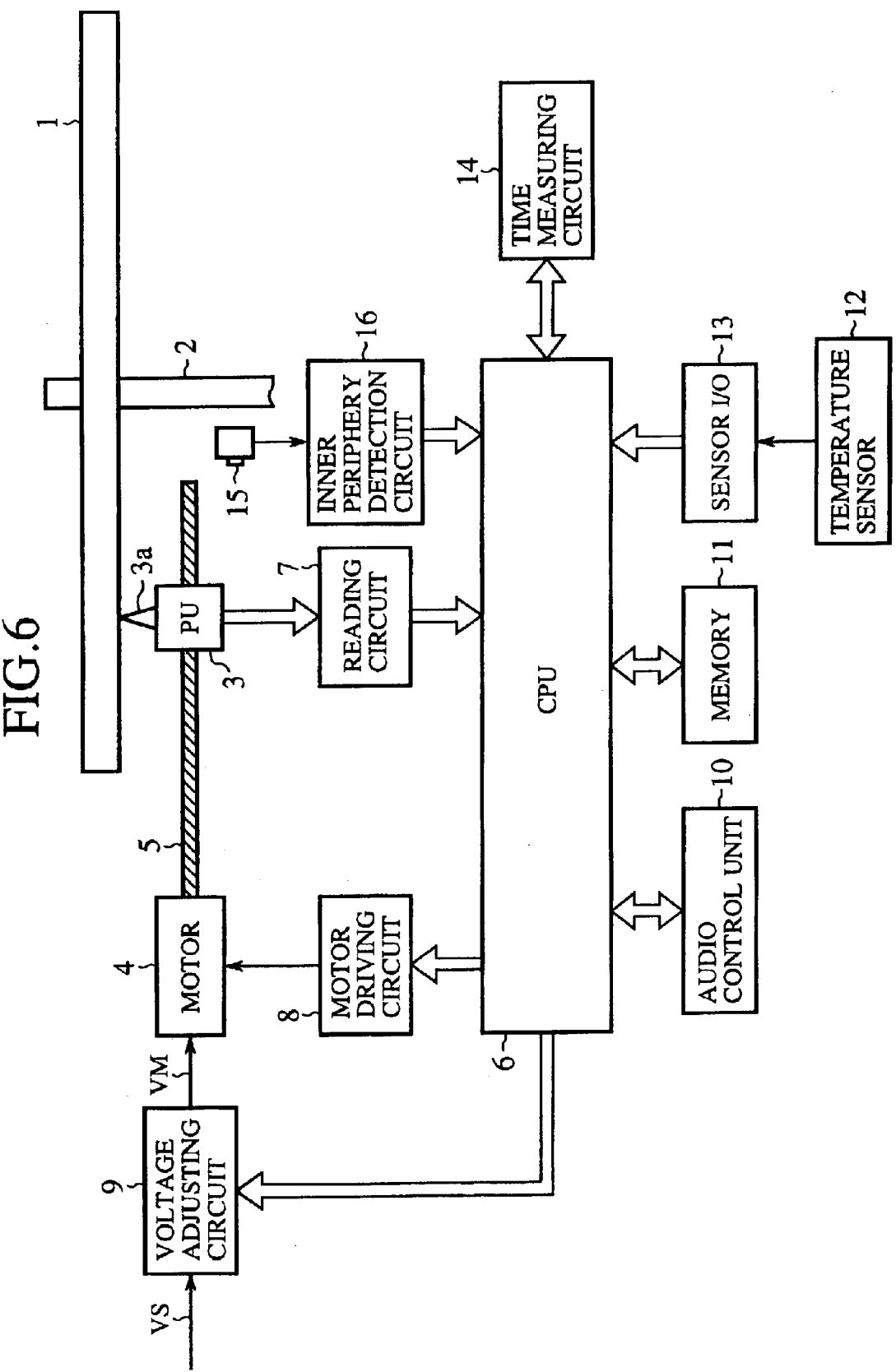
FIG. 6 is a diagram to show a partial structure of a recorded disk reproducing device in accordance with embodiment 3 of the present invention.

FIG. 6 is a diagram to show a partial structure of a recorded disk reproducing device in embodiment 3. In the drawing, a reference numeral 15 denotes a switch (inner periphery detecting means) provided on an inner peripheral side of the recorded disk 1, and 16 denotes an inner periphery detection circuit (inner periphery detecting means) for inputting an ON/OFF state of the switch 15 to the CPU 6. Other constituent elements are the same as those shown in FIG. 1 and are denoted by the same reference numerals and their further descriptions will be omitted.

Next, an operation will be described. The switch 15 is constituted by a microswitch or a proximity switch, for example, and in a case where the optical pickup 3 is moved to a track at the innermost periphery of the recorded disk 1, is turned on, and when the optical pickup 3 is moved to a track outside the track at the innermost periphery, is turned off. That is, when the optical pickup 3 is positioned at the track of an address 0 at the innermost periphery, the switch 15 is turned on.

In a case where a predetermined time (for example, from 10 hours to 20 hours) elapses, the CPU 6 moves the optical pickup 3 to the inner peripheral side and when the switch 15 is turned on and the CPU 6 receives an ON signal from the inner periphery detection circuit 16, stops moving the optical pickup 3. Thereafter, the CPU 6 detects the moving speed of the optical pickup 3 by moving the optical pickup 3 to a track at the outer periphery. As a method of detecting the moving speed, a method of detecting the moving speed by a moving distance in a predetermined time period may be adopted, as is the case with the embodiment 1, or a method of detecting the moving speed by moving the optical pickup 3 to a designated track may be used, as is the case with the embodiment 2. In either of these two methods, the address of the track before the movement is 0, so that the moving speed can be detected by the use of the address Y of the track after the movement.

As described above, according to this embodiment 3, there are provided the switch 15 and the inner periphery detection circuit 16 and thus the CPU 16 detects the moving speed by moving the optical pickup 3 from the track at the innermost periphery detected by the inner periphery detection circuit 16 to the track at the outer periphery, so that it is possible to produce an effect of detecting the moving speed by an extremely simple computing process.

Moreover, according to this embodiment 3, the CPU 6 detects the moving speed of the optical pickup 3 when a predetermined time elapses, so that it is possible to produce an effect that a process of detecting the moving speed has little effect on an ordinary process.

Embodiment 4

Figure 7:
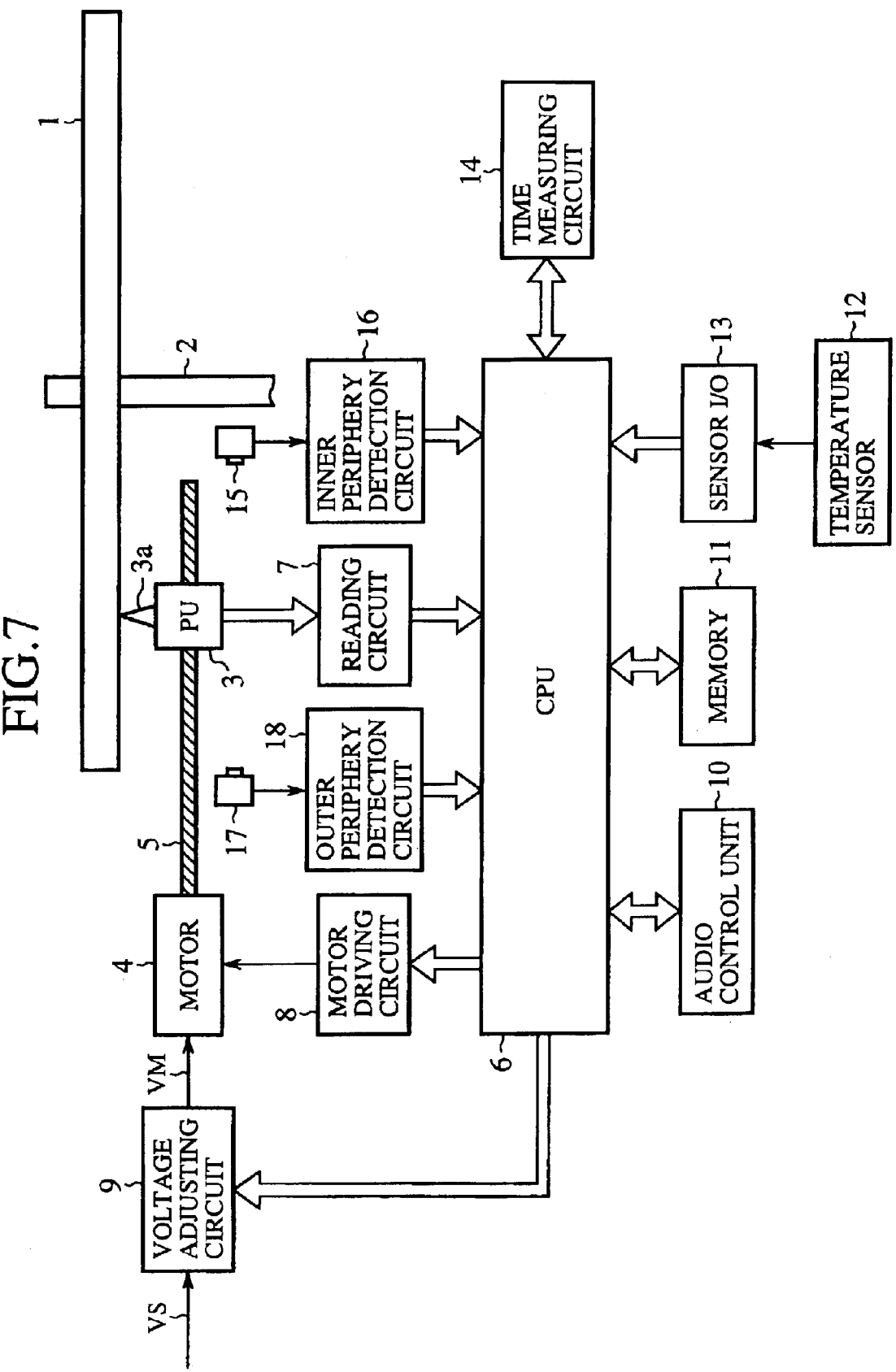
FIG. 7 shows a partial structure of a recorded disk reproducing device in accordance with embodiment 4 of the present invention.

FIG. 7 shows a partial structure of a recorded disk reproducing device in embodiment 4. In the drawing, a reference numeral 17 denotes a switch (outer periphery detecting means) provided on the outer peripheral side of the recorded disk 1, and 18 denotes an outer periphery detection circuit (outer periphery detecting means) for inputting the ON/OFF state of the switch 17 to the CPU 6. Other constituent elements are the same as those shown in FIG. 1 and FIG. 6 and are denoted by the same reference numerals and their further descriptions will be omitted.

Next, an operation will be described. The switch 17 constituted by a microswitch or a proximity switch is turned on in a case where the optical pickup 3 is moved to a track at the outermost periphery of the recorded disk 1 and is turned off in a case where the optical pickup 3 is moved to a track inside the track at the outermost periphery. That is, when the optical pickup 3 is positioned at the track at the outermost periphery, the switch 17 is turned on.

In a case where the recorded disk 1 is put in the device, or when the ambient temperature varies more than a predetermined value, or in a case where a predetermined time elapses, the CPU 6 moves the optical pickup 3 to the inner peripheral side and when the switch 17 is turned on and the CPU 6 receives an ON signal from the inner periphery detection circuit 16, stops moving the optical pickup 3. Thereafter, the CPU 6 moves the optical pickup 3 to a track at the outermost periphery. At the same time, the CPU 6 resets a timer and counts time according to a timer interrupt from the time measuring circuit 14. Then, when the switch 17 is turned on and the CPU 6 receives the ON signal from the outer periphery detection circuit 18, the CPU 6 stops moving the optical pickup 3 and measures time required to move the optical pickup 3.

Then, the CPU 6 compares the measured moving time with a previously set reference moving time and in a case where the measured moving time is longer than the reference moving time, controls to increase the motor driving voltage VM to be supplied to the motor 4, and when the measured moving time is shorter than the reference moving time, controls to decrease the motor driving voltage VM to be supplied to the motor 4.

As described above, according to this embodiment 4, there are provided the switch 15 and the inner periphery detection circuit 16 which detect the optical pickup 3 being positioned at a track on the innermost periphery of the recorded disk 1 and the switch 17 and the outer periphery detection circuit 18 which detect the optical pickup 3 being positioned at a track on the outermost periphery of the recorded disk 1 and the CPU 6 measures the moving time in a case where the optical pickup 3 is moved between the track at the innermost periphery and the track at the outermost periphery. Thus, as is the case with the above mentioned respective embodiments, even in a case where the mechanical load applied to the motor 4 is varied from the designed value by variations in the mechanism and a change in the ambient temperature, it is possible to produce an effect of suppressing variations in the moving time of the optical pickup 3 and to stabilize retrieval.

Further, in this case, only the measuring of the moving time is required, so that it is possible to produce an effect of extremely quickly controlling the motor driving voltage.

Still further, in this case, time when the optical pickup 3 is moved to the track at the outermost periphery is measured by the switch 17 and the outer periphery detection circuit 18 and thus a measurement error is not caused by movement error of the optical pickup 3 caused by inertia. Thus, it is possible to produce an effect of correctly measuring the moving time required for the optical pickup 3 to move from the track at the innermost periphery to the track at the outermost periphery.

Embodiment 5

The structure of a recorded disk reproducing device in embodiment 5 is the same as the structure of the embodiment 4 shown in FIG. 7.

Next, an operation will be described. In the embodiment 5, the CPU 6 carries out operation of a voltage control for suppressing the effect of variations in a load applied to the motor 4 according to an adjusting command from the audio control unit 10 operated by a user.

For example, when the user judges that retrieval operation of the optical pickup 3 is not stable during reproduction of the recorded disk 1, the user inputs an adjusting command to the CPU 6 from an operating part of the audio control unit 10. According to the adjusting command, the CPU 6 moves the optical pickup 3 from the track of the present address X to the track of the address Y on the outermost periphery detected by the switch 17 and the outer periphery detection circuit 18. Then, the CPU 6 measures the moving time of the optical pickup 3 according to a timer interrupt from the time measuring circuit 14. Thereafter, as is the case with the embodiment 2, the CPU 16 detects the moving speed of the optical pickup 3 by measuring the moving time required for the optical pickup 3 to move from the present track where the optical pickup 3 is positioned to the track at the outermost periphery which is the target track. Thus, it is possible to produce an effect of easily obtaining variations in the mechanical load applied to the motor 4.

In this case, when the track of the present address X is the track of an address 0 at the innermost periphery, a processing of measuring the moving time is executed, as is the case with the embodiment 4.

As described above, according to this embodiment 5, there are provided the switch 17 and the outer periphery detection circuit 18 and the CPU 6 detects the moving speed of the optical pickup 3 by moving the optical pickup 3 from the present track to the track at the outermost periphery detected by the outer periphery detection circuit 18, so that is it possible to produce an effect of detecting the moving speed by an extremely simple computing process.

Moreover, according to this embodiment 5, in a case where the user judges that retrieval operation of the optical pickup 3 is not stable, the user inputs the adjusting command to control the motor driving voltage VM. Thus, it is possible to produce an effect of carrying out the voltage control for suppressing the effect of variations in the load applied to the motor 4 at any time when the user judges the voltage control to be necessary.

Here, in the above mentioned respective embodiments, the present invention has been described by taking the recorded disk reproducing device for reproducing the recorded disk 1 such as a CD or an MD on which the information of music is recorded as an example, but the present invention can be applied also to the recorded disk reproducing device for reproducing the recorded disk on which other information is recorded. For example, the present invention can be applied also to the recorded disk reproducing device for reproducing a DVD (digital video disk) on which image information is recorded or a recorded disk reproducing device for reproducing a CD-ROM or an HD on which computer information is recorded.

What is claimed is:

1. A recorded disk reproducing device comprising:

reading means for reading information recorded on a track of a recorded disk;

driving means for moving the reading means in a radial direction of the recorded disk;

speed detecting means for detecting a moving speed of the reading means according to a relationship between a moving time of the reading means moved by the driving means and the number of tracks over which the reading means passes in the moving time;

voltage control means which compares a detected moving speed detected by the speed detecting means with a previously set reference moving speed and when the detected moving speed is smaller than the reference moving speed, controls to increase a power supply voltage to be supplied to the driving means, and when the detected moving speed is larger than the reference moving speed, controls to decrease the power supply voltage to be supplied to the driving means; and periphery detecting means including a switch which is turned on when the reading means is positioned at a track on at least any one of an innermost periphery and an outermost periphery of the recorded disk, wherein, the speed detecting means detects the moving speed of the reading means by an operation that the reading means is moved from the track on at least any one of the innermost and the outermost periphery detected by the periphery detecting means to another track.

2. The recorded disk reproducing device according to claim 1, wherein the speed detecting means detects the moving speed of the reading means by a present track where the reading means is positioned and a track to which the reading means is moved in a predetermined time.

3. The recorded disk reproducing device according to claim 1, wherein the speed detecting means detects the moving speed of the reading means by measuring a moving time required for the reading means to move from a present track where the reading means is positioned to a designated target track.

4. The recorded disk reproducing device according to claim 1, wherein the speed detecting means detects the moving speed of the reading means when the recorded disk is put in the device.

5. A recorded disk reproducing device comprising:

reading means for reading information recorded on a track of a recorded disk;

driving means for moving the reading means in a radial direction of the recorded disk;

speed detecting means for detecting a moving speed of the reading means according to a relationship between a moving time of the reading means moved by the driving means and the number of tracks over which the reading means passes in the moving time;

voltage control means which compares a detected moving speed detected by the speed detecting means with a previously set reference moving speed and when the detected moving speed is smaller than the reference moving speed, controls to increase a power supply voltage to be supplied to the driving means, and when the detected moving speed is larger than the reference moving speed, controls to decrease the power supply voltage to be supplied to the driving means, wherein the speed detecting means detects the moving speed of the reading means when an ambient temperature varies more than a predetermined value.

6. The recorded disk reproducing device according to claim 1, wherein the speed detecting means detects the moving speed of the reading means when a predetermined time elapses.

7. The recorded disk reproducing device according to claim 1, wherein the speed detecting means detects the moving speed of the reading means according to a predetermined adjusting command.

8. A recorded disk reproducing device comprising:

reading means for reading information recorded on a track of a recorded disk;

driving means for moving the reading means in a radial direction of the recorded disk;

speed calculating means for calculating a moving speed of the reading means based on a moving time of the reading means moved by the driving means and track addresses read out before and after moving of the reading means;

voltage control means which compares a calculated moving speed calculated by the speed calculating means with a previously set reference moving speed and in a case where the calculated moving speed is smaller than the reference moving speed, controls to increase a power supply voltage to be supplied to the driving means, and in a case where the calculated moving speed is larger than the reference moving speed, controls to decrease the power supply voltage to be supplied to the driving means.

* * * * *